Patented Nov. 7, 1950

2,529,316

UNITED STATES PATENT OFFICE 2,529,316

PROCESS FOR ACYLATING BUTADIENE-STYRENE COPOLYMERS

William H. Smyers, Westfield, and Edward P. Cashman, Bayonne, N. J., assignors to Standard Oil Development Company, a corporation of Delaware No Drawing. Application April 2, 1947, Serial No. 738,914

3 Claims. (Cl. 260—85.1)

This invention relates to novel chemical products and to methods of preparing and using the same. More particularly, it relates to making and using acylated derivatives of high molecular weight copolymers of the synthetic rubber type and of similar compositions.

It has been found that a product having valuable properties when blended in hydrocarbon lubricating oils, rubbery products, and other hydrocarbon compositions can be produced by reacting a high molecular weight copolymer of the styrene-butadiene synthetic rubber type or similar product with an acylating agent, typified by stearyl chloride, in the presence of a Friedel-Crafts type catalyst. The product formed by such a reaction has been found to be soluble in mineral oils and to possess good pour depressing properties when blended in a mineral lubricating oil and to have generally the property of modifying the structure of paraffin wax, whether in the pure state or as a component of paraffinic type lubricating oils. The product is also useful as a plasticizer for natural rubber and various synthetic rubbers. The hydrocarbon copolymers which are acylated in accordance with the present invention are characterized by having a high iodine number, that is, of the order of at least 200 and preferably at least 300.

The type of copolymers which may be acylated to produce products having the above-described advantageous properties in accordance with the present invention may be defined as the copolymers of aliphatic diolefins, or halogen-substituted aliphatic diolefins, and polymerizable hydrocarbons containing an aromatic nucleus, or substitution products thereof in which the substituting groups, preferably nuclear substituents, consist of, or contain, one or more of the elements hydrogen, oxygen, nitrogen, sulfur, and the halogens. The copolymer, before acylation, should contain about 60 to 80% by weight of the diolefinic component and 20 to 40% of the aromatic type component, and the copolymer may also contain small amounts, not more than 10%, of other essentially hydrocarbon materials.

Illustrative of the diolefinc compounds which enter into the formation of the copolymers which are reacted in accordance with the present invention are butadiene, isoprene, chlorbutadiene, dimethylbutadiene, hexadiene, and the like.

The class of polymerizable aromatic type compounds which may be copolymerized with the aforesaid diolefins is of fairly wide scope, and the following compounds may be listed as typical: styrene, alphamethylstyrene, paramethylstyrene, parachlorstyrene, 2,5-dichlorstyrene, alphamethylparamethylstyrene, dihydronaphthalene, vinyl naphthalene, indene, coumarone, coumarin, indole, and benzothiophene, or mixtures of these or equivalent materials.

The two components of the desired copolymer may be polymerized together by known methods, for example, by mass polymerization or emulsion polymerization. As stated above, it is preferable to employ from 60 to 80% of the diolefinic component and from 20 to 40% of the second type of compound. A particularly suitable copolymer is formed by copolymerizing styrene with butadiene, especially when the proportion of styrene is from 25 to 35% and the proportion of butadiene from 65 to 75%. The product formed by reacting 25% styrene with 75% butadiene is preferred for this invention.

The acylating agent to be used in accordance with this invention for reacting with a copolymer of the above-described class may be selected from a wide variety of materials having the general formula $R(COX)_n$, where R is a hydrocarbon group, X is a halogen and $n$ is an integer from 1 to 3, preferably 1 to 2. The acylating agent most generally preferred is derived from a fatty acid, and when the product is to be employed as an additive for a lubricating oil, the hydrocarbon radical should comprise 5 to 30 carbon atoms, acyl chlorides having from 10 to 20 carbon atoms in an alkyl group being especially desirable. Suitable acyl halides may be derived, for example, from palmitic acid, stearic acid, phenyl stearic acid, adipic acid, sebacic acid, cocoanut oil acids, commercial fat acids, mutton tallow fatty acids, arachidic acids, and the like. Where solubility of the product in oil is not required, the acylating agent may be a short chain acyl chloride, such as acetyl chloride. Naphthenyl halides, derived from petroleum naphthenic acids, may also be used, as well as acid halides derived from cyclohexane carboxylic acid, phthalic acid, and the like. Slightly unsaturated acid halides may also be used such as oleyl chloride. For making a plasticizer for synthetic rubber, lower acylating agents may be used, e. g. acetyl chloride, propionyl chloride, butyryl chloride, succinyl chloride, etc.

In carrying out the acylation reaction, it is desirable to employ from 1 to 10 parts by weight of acylating agent to 1 part of the copolymer, 1 to 5 parts of the acylating agent being preferred when a long chain acylating agent, of the order of 10 carbon atoms or more, is employed. The amount of acylating agent which it is desirable to use in a particular case will depend partly on the proportion of the combined cyclic constituent in the copolymer, as well as upon the molecular weight of the acylating agent, and upon the purpose for which the product is to be used.

The acylation is preferably carried out in the presence of a Friedel-Crafts type catalyst, such as aluminum chloride, zinc chloride, stannic chloride, boron fluoride, anhydrous hydrogen fluoride, and the like. The amount of this catalyst required is generally from 0.5 to 3 parts per 1 part of copolymer. The catalyst is preferably added in small portions during the course of the reaction.

The reaction is preferably carried out in the presence of a suitable inert solvent, including highly halogenated hydrocarbons, such as carbon tetrachloride, tetrachlorethane, o-dichlorbenzene, and the like, as well as hydrocarbon solvents such as refined aliphatic hydrocarbons of the type of heavy naphtha, kerosene and the like. The amount of solvent may range from about 1 to 20 volumes or so per volume of the reactants present.

The temperature required for the acylating reaction depends partly upon the reactivity of the particular acylating agent used and partly upon the amount of solvent and the proportion of combined cyclic constituent in the copolymer, but normally will range from about 100° to about 300° F., preferably from 125° to 250° F.

The time required for the completion of the reaction may vary from ½ to 10 hours, depending upon the nature of the reactants and the temperature of the reaction, but the reaction will normally be completed within 1 to 5 hours. The completion of the reaction is evidenced by the substantial cessation of hydrogen chloride evolution. When the reaction is completed, the mixture may be cooled, and, if very viscous, is then preferably diluted with additional solvent; and then the residual catalyst is destroyed by adding water, alcohol, aqueous hydrochloric acid, aqueous caustic soda, etc. The resulting catalyst sludge is then withdrawn and the solvent extract containing the desired acylated copolymer may be washed repeatedly, preferably until the final wash water shows no test for acid with litmus paper. The acylated copolymer may, if desired, be used in solution in the solvent if thus recovered, or the solvent may be removed by distillation or other suitable means so as to recover the acylated copolymer per se. If it is desired to use the acylated copolymer eventually in solution in a mineral lubricating oil, a small amount of such oil may be added to the volatile oil solution before evaporation of the volatile solvent so that after such evaporation the residue will consist of a mineral lubricating oil concentrate of the acylated copolymers, containing, for example, about 15% to 50% of such acylated copolymer. If the copolymer precipitates out of the solvent before or upon addition of the catalyst destroying or hydrolyzing agent, the copolymer may be washed by mixing, milling or kneading with water until freed of catalyst, and then dried by hot mixing or vacuum drying, etc.

The product of this invention, namely, the acylated copolymer of a diolefin and a compound containing an aromatic group, is thus a high molecular weight polymeric linear type copolymer chain having aromatic groups attached thereto or incorporated therein, and it is believed that the acylation reaction results in attaching an additional hydrocarbon group to the aromatic nuclei through a carbonyl linkage. Such hydrocarbon groups, especially if having 4 or more carbon atoms, attached as the result of acylation considerably increase the solubility of the copolymer in hydrocarbon oil, and thus the products are rendered suitable as mineral oil additives. When an acylating agent having at least two acylating groups, e. g., phthalyl chloride, is used, several molecules of the copolymer will be interlinked by such acylating agent. The molecular weight of the final product will be only slightly more than the original copolymer if no interlinking has taken place, but may be two, three or more times as great if interlinking has been effected. The product will range from a viscous or waxy oil to a hard waxy, rubbery or resinous solid. Its iodine number generally is less than 100, and preferably is about 10 to 50.

As stated above, the acylated products of the present invention are useful as pour depressors for lubricating oils. They have also been found to possess certain viscosity index improving properties. The compounds may be employed as additives for pure paraffin wax, for modifying the physical properties of such wax, as lube oil dewaxing aids. They are also useful as plasticizing agents for natural rubber, synthetic rubber of various types, e. g., butadiene-styrene, butadiene-acrylonitrile, isobutylene - isoprene, polychloroprene, etc.

When the compositions of the present invention are to be employed as pour depressors for mineral lubricating oils, they are employed in concentrations ranging from about 0.01% to about 5%, although amounts from 0.1% to 2.0% are generally preferred.

The preparation and testing of typical products of the present invention as additives for lubricating oil is illustrated by the following examples, which are given by way of illustration only, and are not to be considered as limiting the scope of the invention in any way.

*Example 1*

13.5 g. of synthetic rubber prepared by copolymerizing 75% butadiene and 25% styrene, 50 g. stearyl chloride, and 500 ml. carbon tetrachloride were placed in a 3-liter 4-neck flask equipped with a mechanical agitator, thermometer and gas outlet. The temperature was raised to 110° F., the catalyst consisting of a total of 25 g. aluminum chloride was added in seven portions over a period of 30 minutes while permitting the temperature to rise to 125° F., and then heated to 175° F. over a period of 50 minutes. The catalyst was removed by adding a mixture of alcohol and water together with a small amount of hydrochloric acid, and the product recovered by vacuum distillation in the presence of 50 g. of test oil (90% acid treated paraffin distillate, viscosity 44.2 seconds Saybolt at 210° F., + 10 % Pennsylvania Bright Stock, viscosity 150 seconds Saybolt at 210° F.) to 210° F. A yield of 102 g. of rubber-like material was obtained which was only slightly soluble in the test oil. In a qualitative experiment, the test oil containing a small amount of acylated product exhibited an ASTM pour point of −15° F., whereas the pour point of the unblended oil was +30° F.

*Example 2*

13.5 g. synthetic rubber, prepared by copolymerizing 75% butadiene and 25% styrene, 50 g. stearyl chloride, and 500 ml. o-dichlorbenzene were reacted in equipment similar to that employed in Example 1, using 25 g. aluminum chloride as catalyst. The catalyst was added over a period of ½ hour at a temperature of 150° F., after which the temperature was raised to 175° F. for 40 minutes. The catalyst was removed as in Example 1 and the product recovered by vacuum distillation to 450° F. in the presence of 50 g. of test oil (same as in Example 1). 92 g. of a brown waxy oil was obtained. The iodine number of the original synthetic rubber was 315 whereas the iodine number of the product was found to be 28. Concentrations of this product of 0.5% and 1.0% in a paraffinic oil blend showed the following results in the ASTM Pour Point Test and the SOD Pour Stability Test. The latter is an accelerated laboratory test in which field storage conditions are simulated by subjecting the samples to successive periods of cooling, warming, and further cooling. The test is conducted by first rapidly cooling from room temperature to about 15° F., then warming to about 34° F. and maintaining at this temperature for about 24 hours, further warming to about 50° F., and finally cooling to −20° F. over a period of 72 hours. The results are shown in the following table:

| Per Cent of Product [1] in Test Oil [2] | ASTM Pour Point, °F. | SOD Stable Pour Point, °F. |
|---|---|---|
| 0.5 | −30 | Lower than −20 |
| 1.0 | −30 | Lower than −20 |

[1] Product is approximately one-half oil.
[2] Test oil: 96.5% acid treated paraffin distillate, viscosity 44.2 seconds Saybolt at 210° F., and 3.5% Pennsylvania Bright Stock, viscosity 150 seconds Saybolt at 210° F.

*Example 3*

The amounts and composition of materials employed were the same as in Example 2, and the procedure was the same, except that the temperature was increased from 112° F. to 175° F. over a period of 1 hour, by constantly increasing the temperature. After adding 50 g. of the test oil to the neutral oil solution, the product was recovered by vacuum distillation to 525° F. 110 g. of a brown waxy oil was obtained. In the pour stability test (referred to in Example 2) blends in the same base oil did not solidify at −20° F., as shown in the following table:

| Per Cent of Product [1] in Test Oil [2] | ASTM Pour Point, °F. | SOD Stable Pour Point, °F. |
|---|---|---|
| 0.2 | −20 | Lower than −20 |
| 0.4 | −10 | Lower than −20 |

[1] Product is approximately one-half oil.
[2] Test oil: was the same as in Example 2.

*Example 4*

The procedure of Example 3 was repeated exactly, except for possible slight differences in the control of the reaction temperature and the final vacuum distillation. A yield of 95 grams of distillation residue was obtained. This material was of course a blend or concentrate of the condensation product per se in the mineral lubricating oil base stock which had been added before evaporation of the solvent. 0.3% by weight of this concentrate was dissolved in the same test oil as used in Example 3, and the resulting blend was found to have an ASTM pour point of −15° F., which is in the same general range as the pour points obtained in Example 3, but the product of Example 4 showed an SOD stable pour point below −25° F., which is somewhat better than that obtained with the product of Example 3.

Winter field storage tests were also carried out on the product of Example 4 in comparison with two commercial pour depressors, with the following results:

| Concentration, Per Cent [1] | Additive | ASTM Pour Point, °F. | Winter Field Storage Tests [2] | | |
|---|---|---|---|---|---|
| | | | No. of Observations | No. of Times Solid | Pour Stability Rating, Per Cent [3] |
| 1 | Pour Dep. A | −25 | 217 | 73 | 66 |
| 1 | Pour Dep. B | −5 | 217 | 96 | 56 |
| 0.25 | Prod. Ex. 4 | −15 | 217 | 7 | 97 |

[1] The concentrations used are believed to contain comparable amounts of active ingredients. The base oil was the same as that employed in the pour stability tests of Examples 2 and 3.
[2] Representing a summary of tests at four different locations including one very cold location in Canada, two cold locations in the United States, and one mild location in the United States.
[3] $\frac{\text{No. of times fluid}}{\text{Total No. of observations}} \times 100\%$ The above data show that in the winter field storage tests the product of Example 4 of the present application has a pour stability rating of 97%, which is almost perfect, compared to pour stability ratings of 56 and 66% for the two commercial pour depressors.

The distillation residue obtained in Example 4 according to this invention was subjected to chemical analysis and found to contain 84.94% carbon, 12.32% hydrogen, 0.56% chlorine, and 2.18% oxygen (by difference). The lubricating oil base stock which had been added prior to distillation showed on analysis 86.57% carbon and 13.22% hydrogen, the total being 99.79%. As it was suspected that some of the lubricating oil which had been added before distillation might have been carried overhead during the distillation because of the presence of the large amount of volatile solvent and its effect in reducing the partial pressure, a check distillation run was made on a solution of 50 grams of the same lubricating oil base stock in 500 cc. of the same volatile solvent and using approximately the same vacuum distillation conditions. The distillation residue obtained weighed 42 grams, thus indicating that 8 grams of the oil had been carried overhead during the distillation. If substantially the same loss of oil occurred during the distillation in Example 4, calculation indicates that approximately three stearyl groups have been combined into the condensation product for each original butadiene-styrene synthetic rubber unit, by which is meant six molecules of butadiene and one molecule of styrene. On this basis, the empirical formula for the condensation product of Example 4 is:

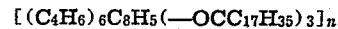

where $n$ is an integer indicating the degree of polymerization in the original synthetic rubber.

Although the chemistry of the reactions involved is not known with certainty, it is believed that the three stearyl groups mentioned above have combined onto the aromatic nucleus of the styrene molecule, and that these groups are essentially responsible for the solubilizing and pour depressing properties. On the other hand, the tremendous and unexpected reduction in iodine number of the original synthetic rubber from 317 down to 28 in the condensation product is believed to result primarily from a polymerization of aliphatic olefin groups in the polymerized butadiene portion of the synthetic rubber, although there may also be a small amount of joining of such olefin groups onto some styrene molecules which have not been completely acylated.

Example 5

A chlorwax-naphthalene type pour depressor was made by condensing about 100 parts by weight of chlorinated paraffin wax having a chlorine content of about 14 to 14.5% with 13.5 parts by weight of naphthalene, using about 2 to 2.5 parts of aluminum chloride as catalyst, and carrying out the reaction in the presence of 12.5 parts of o-dichlorbenzene as inert solvent. The naphthalene and o-dichlorbenzene were mixed and the catalyst added at 100–110° F. The chlorinated wax was then added over a period of 30 to 35 minutes, allowing the temperature to rise to 125° F. This temperature was maintained for a period of 3 to 4 hours, after which the mixture was diluted with 100 parts of o-dichlorbenzene. The mixture was then neutralized with strong aqueous caustic solution and alcohol. After settling, the aqueous layer was drawn off and the product recovered by steam distillation of the residue to a temperature of 550–570° F. The bottoms from this distillation were then blended in 15 to 20% concentration in lubricating oil. This chlorwax-naphthalene pour depressor was then mixed in equal proportions with the stearylated butadiene-styrene synthetic rubber made as in Example 2, and the resulting mixture was blended in 0.5% and 1.0% concentrations in a waxy mineral lubricating oil. In the pour stability test, these blends did not become solid at −20° F., whereas blends of the same concentrations of chlorwax-naphthalene pour depressor alone showed a stable pour point of about +20° F.

Example 6

The following proportions of materials were used:

27 grams butadiene-styrene synthetic rubber (25% styrene)
1000 ml. o-dichlorbenzene
100 g. stearyl chloride
50 g. aluminum chloride The synthetic rubber was dissolved in the o-dichlorbenzene and the stearyl chloride was added. The temperature was adjusted to 110° F. Then the aluminum chloride was added in 7 portions over 30 minutes, permitting the temperature to rise to 125° F. where it was held for 30 minutes and the mixture was heated to 180° F. and maintained there for two hours. The reaction mixture was then diluted with alcohol and water. After separation and removal of the catalyst the condensation product was recovered by high vacuum distillation to 510° F., giving a distillation residue yield of 96 grams of dark brown viscous oil, which on very slight cooling became a soft waxy solid. This is the same type of condensation product as was produced in Examples 1 to 4, except that it is recovered free from any added oil.

Example 7

About 1 part by weight of the condensation product made in Example 6 was mixed, by kneading, with about 4 parts by weight of butadiene-styrene synthetic rubber (containing about 25% styrene), and after about 15 minutes of kneading the mixture was homogenous and well plasticized. This indicates that the stearylated butadiene-styrene synthetic rubber makes an unexpectedly efficient plasticizer for synthetic rubber.

It is not intended that this invention be limited to the specific materials which have been given merely for the sake of illustration, but only by the terms of the appended claims.

We claim:

1. A process of preparing a suitable pour point depressing composition for use in lowering the pour point of waxy mineral base lubricating oils which comprises reacting about one part by weight of a solid rubbery copolymer of from 60% to 80% by weight of butadiene and from 20% to 40% by weight of styrene, which copolymer has an iodine number of at least 200, with from one to 5 parts by weight of stearyl chloride in the presence of a solvent inert to the copolymer and from 0.5 to 3 parts by weight of a Friedel-Crafts catalyst at a temperature within the range of from 125° to 250° F. for a period of time of from ½ to 10 hours and until the iodine number of the resulting composition is less than 100.

2. A process according to claim 1 wherein the copolymer is composed of about 25% styrene and about 75% butadiene.

3. A process according to claim 1 wherein the catalyst used is aluminum chloride.

WILLIAM H. SMYERS.
EDWARD P. CASHMAN.

REFERENCES CITED

The following references are of record in the file of this patent:

UNITED STATES PATENTS

| Number | Name | Date |
|---|---|---|
| 2,147,547 | Reiff | Feb. 14, 1939 |
| 2,197,709 | Ralston | Apr. 16, 1940 |
| 2,281,613 | Wollthan | May 5, 1942 |
| 2,325,983 | Sarbach | Aug. 3, 1943 |
| 2,352,280 | Mikeska | June 27, 1944 |
| 2,399,817 | Meyer | May 7, 1946 |
| 2,422,932 | Schroeder | June 24, 1947 |
| 2,432,460 | Unruh | Dec. 9, 1947 |
| 2,437,980 | Seymour | Mar. 16, 1948 |
| 2,472,495 | Sparks | June 7, 1949 |